United States Patent [19]
Valiant

[11] Patent Number: 5,083,265
[45] Date of Patent: Jan. 21, 1992

[54] BULK-SYNCHRONOUS PARALLEL COMPUTER

[75] Inventor: Leslie G. Valiant, Belmont, Mass.

[73] Assignee: President and Fellows of Harvard College, Cambridge, Mass.

[21] Appl. No.: 510,090

[22] Filed: Apr. 17, 1990

[51] Int. Cl.$^5$ .............................................. G06F 15/16
[52] U.S. Cl. .................................. 395/800; 364/228.7; 364/281.3; 364/271; 364/271.2; 364/DIG. 1
[58] Field of Search .............................. 364/200, 900

[56] References Cited

U.S. PATENT DOCUMENTS

| | | | |
|---|---|---|---|
| 4,736,287 | 4/1988 | Druke et al. | 364/200 |
| 4,814,979 | 3/1989 | Neches | 364/200 |
| 4,825,360 | 4/1989 | Knight, Jr. | 364/200 |
| 4,901,229 | 2/1990 | Tashiro et al. | 364/200 |
| 4,965,882 | 10/1990 | Barabash et al. | 364/200 |
| 4,969,088 | 11/1990 | McAuliffe et al. | 364/200 |
| 4,989,131 | 1/1991 | Stone | 364/200 |

OTHER PUBLICATIONS

Kuehn, J. T. et al., *Proc. Supercomputing IEEE*, pp. 28–34, (1988).
Ranade, A. G., *Proc. Symposium on Foundation of Computer Science IEEE*, pp. 185–194 (1987).
Valiant, L. G., *Phil. Trans. R. Soc. Lond A*, 326:272–276 (1988).
Fox, G. C. et al., *Proc. 12th IMACS World Congress on Scientific Computations* (1988).
Gibbons, P. B., *Proc. ACM Symposium on Parallel Algorithms and Architectures*, pp. 158–169 (1989).
C. P. Kruskal, L. Randolph, and M. Snir, *A Complexity Theory of Efficient Parallel Algorithms*, Research Report RC 13572, I.B.M., T. J. Watson Research Center, Yorktown Heights, N.Y. (1988), [Revised version in Theoretical Computer Science, 71 (1990), pp. 95–132].

Primary Examiner—Michael R. Fleming
Assistant Examiner—Debra A. Chun
Attorney, Agent, or Firm—Hamilton, Brook, Smith & Reynolds

[57] ABSTRACT

In accordance with the present invention, system architecture and programming are in accordance with a bulk-synchronous parallel processing model. Data is distributed to memory elements through a hashing function performed in individual hardware modules associated with computational elements. The router operates independently of the computational and memory elements and masks any substantial latency it may have by pipelining. A synchronizer provides for bulk synchronization in supersteps of multiple computational steps. The router bandwidth is balanced with that of the computational elements and the program may be compiled to a number of virtual processors significantly greater than the number of actual processors in the system.

25 Claims, 1 Drawing Sheet

BULK-SYNCHRONOUS PARALLEL COMPUTER

GOVERNMENT SUPPORT

This invention was made with Government support under grant DCR-86-00379 awarded by the National Science Foundation. The Government has certain rights in the invention.

RELATED PUBLICATIONS

Details of the present invention can be found in:

L. G. Valiant, A bridging model for parallel computation, *Communications of the ACM* (1990).

L. G. Valiant, General purpose parallel architectures, *Handbook of Theoretical Computer Science*, (ed. J. van Leeuwen) North Holland Amsterdam (1990).

L. G. Valiant, Bulk-synchronous parallel computers, *Parallel Processing and Artificial Intelligence*, M. Reeve and S. E. Zenith (eds.). Wiley. (1989) 15-22.

BACKGROUND OF THE INVENTION

In a conventional sequential computer, processing is channelled through one physical location. The success, rapid development and widespread use of sequential computers can be attributed to the existence of a central unifying model, namely the von Neumann computer. Even with rapidly changing technology and architectural ideas hardware designers can still share the common goal of realizing efficient von Neumann machines, without the need for too much concern about the software that is going to be executed. Similarly, the software industry in all its diversity can aim to write programs that can be executed efficiently on this model, without explicit consideration of the hardware. Thus the von Neumann model is the connecting bridge that enables programs from the diverse and chaotic world of software to run efficiently on machines from the diverse and chaotic world of hardware. By providing a standard interface between the two sides, it encourages their separate, rapid development.

In a parallel machine, processing can occur simultaneously at many locations and consequently many more computational operations per second should be achievable. Because of the rapidly decreasing cost of processing, memory, and communication it has appeared inevitable for at least two decades that parallel machines will eventually displace sequential ones in computationally intensive domains. This, however, has not yet happened.

SUMMARY OF THE INVENTION

What is required before general purpose parallel computation can succeed is the adoption of an analogous unifying bridging model for parallel computation. A major purpose of such a model is simply to act as a standard on which people can agree. In order to succeed in this role, however, the model has to satisfy some stringent quantitative requirements, exactly as does the von Neumann model. Despite the clear benefits that might flow from the adoption of a bridging model, relatively little effort appears to have been invested in discovering one Some very relevant issues, but in a slightly different context, are discussed in L. Snyder, Type architectures, shared memory, and the corollary of modest potential, *Ann. Rev. Comput. Sci.* (1986) vol 1, 289-317.

We introduce the bulk-synchronous parallel (BSP) model and provide evidence that it is a viable candidate for the role of bridging model in a hardware/software system. In justifying the model, our main argument is that, when mapping high-level programs to actual machines, in a great variety of contexts, little efficiency is lost if we go via this single model. The adoption of such a standard can be expected to insulate software and hardware development from each other and make possible both general purpose machines and transportable software.

In accordance with the present invention, a plurality of computational elements are able to process multiple instructions on multiple sets of data (MIMD) in parallel. The computational elements have a common hashing function associated therewith for distributing data to a plurality of memory elements. The computational and memory elements communicate through a router. The router routes data transfers independently of continued computation and storage access in the computational and memory elements and masks any latency due to long, logical paths, if any exist, by pipelining. A synchronizer provides for bulk-synchronization of multiple instruction computational tasks in individual computational elements. Individual tasks must be completed in all synchronized computational elements before the elements proceed to a next task.

Each computational element has a capability for efficiently computing hash addresses. This may be done by a software or hardware hashing module associated with a router interface.

In order to have the system run at optimal efficiency for the widest class of applications, the router should have a bandwidth which is balanced with the bandwidth of the computational elements. Specifically, the ratio g of the number of basic computational operations performed per second by all the processors to the total number of data words delivered per second by the router should be a low constant, generally less than three but in some cases possibly as high as ten.

In use, the machine may be programmable directly. with the programmer allocating processors and memory explicitly. More usually, we expect it to be programmed in a higher level language that relieves the programmer of the burden of allocating processors and memory directly. In the latter case, a demonstrably favorable situation is that of compiling a program having significant slack. In other words, the high level program is written for v virtual processors, where v significantly exceeds p, the number of phyical processors. This slack gives freedom to the compiler to schedule the tasks evenly among the elements of the system and freedom to the hardware to mask latency by pipelining. For hashing to be efficient and for latency to be hidden on a logarithmic diameter network such as a hypercube, one needs that v exceed plog p. The periodicity L. the number of computational operations that a processor can perform between successive synchronications, is also a controllable parameter For hashing to work most efficiently, L has to exceed about glog p.

The quantitative arguments for the model are mainly efficient universality results. Below we shall discuss efficient implementations on the model of high-level language features and algorithms and implementations of the model in hardware. In all cases we aim to achieve optimal simulations, by which we mean that the time taken is optimal to within constant multiplicative factors, that are independent of the number of processors as this number scales up, and usually small. We wish to avoid logarithmic losses in efficiency. Although we express the results asymptotically, we regard the model as neutral about the number of processors, be it two or a million. This is justified whenever the constants are indeed small. The major advantage of the invention over previous art is that, rather than losing logarithmic factors, the invention achieves optimal simulation simultaneously in both the simulations of the software and the simulations on the hardware as the number of processing elements scale up. That the invention does have the claimed advantages can be deduced by analysis.

DESCRIPTION OF PREFERRED EMBODIMENTS

As is typical of massively parallel computer systems, the present invention comprises a plurality of processing elements PE which communicate through a router 12. In accordance with the present invention, the router operates independently of the individual processing elements. Once a data packet is delivered to the router, the packet is routed through the network to its destination without any burden on the processing elements which may continue their processing. Further, in accordance with the invention, and as will be described in greater detail below, the individual processing elements operate in accordance with a barrier synchronization protocol which may be supervised by a master synchronizer 14. The synchronizer assures that all computing and memory elements, as well as the router, have completed a particular multiple-operation task prior to continued processing of the next task. Synchronization may be at supersteps of L of computational steps length. At the end of each superstep, the synchronizer checks whether the router and each processing element have completed their task and, if so, signals all processing elements to continue to the next task. As an alternative to completion being checked at regular intervals, the completion of the tasks could itself prompt the barrier that signals that the system can proceed to be the next superstep. The parameter L then corresponds to the typical expected completion time.

Figure 1:
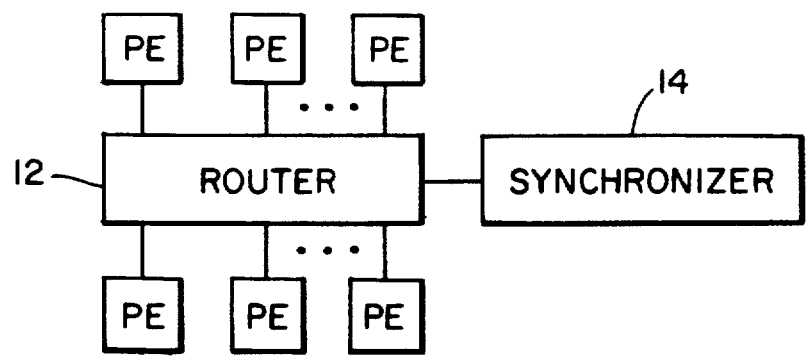
FIG. 1 is a block diagram of a bulk-synchronous parallel computer embodying the present invention.
Figure 2:
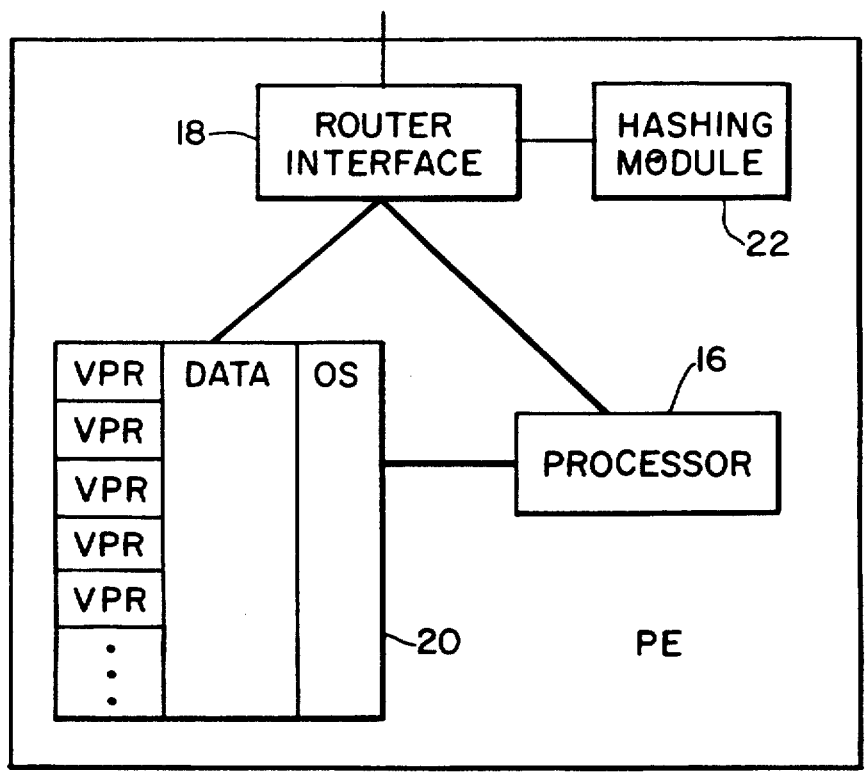
FIG. 2 is a block diagram of one of the processing elements of FIG. 1.

FIG. 2 illustrates an individual processing element. In this embodiment, the processing elements are both computational and memory elements. Computation is performed by a processor 16 which communicates with the router 12 through a router interface 18. Memory 20 includes any local operating system routines, data storage, and program routines. As illustrated, the program may be subdivided into a plurality of virtual processor routines to be processed by the processing element. A number of virtual processor routines VPR would be assigned to and processed by the processor element PE during each superstep.

The data storage is part of a global memory space. To efficiently allocate storage without slowing memory accesses or overloading individual memory units, memory is distributed in accordance with a hashing function which is shared by all elements of the system. Preferably, the hashing function is performed by a hardware hashing module 22 associated with the router interface. Such a module provides for rapid hashing to increase the communication speed, without slowing the computations performed by the processor 16.

Figure 3:
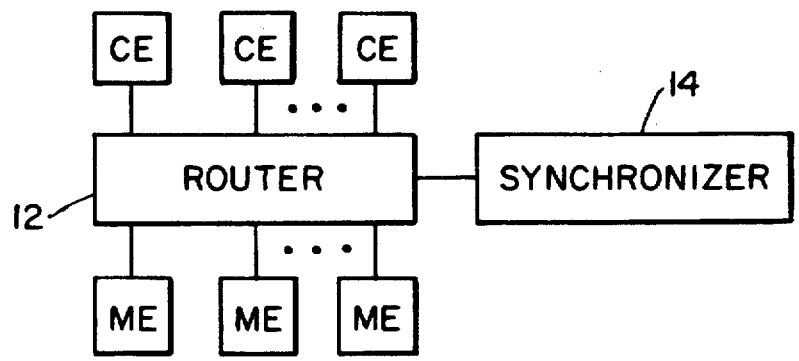
FIG. 3 is a block diagram of an alternative embodiment in which the processing and memory elements are separate.

Each processing element need not perform the dual functions of computation and memory. Rather, the functions may be separated as illustrated in FIG. 3. In that case, computational elements CE communicate with each other and with memory elements ME through the router 12. Again, the router and the elements are synchronized by a synchronizer 14.

Since the difficulties of programming present a severe potential obstacle to parallel computing, it is important to give the programmer the option of avoiding the onerous burdens of managing memory, assigning communication and doing low-level synchronization. A major feature of the BSP model is that it provides this option with optimal efficiency (i.e., within constant factors) provided the programmer writes programs with sufficient parallel slackness. This means that programs are written for v virtual parallel processors to run on p physical processors where v is rather larger than p (e.g. $v = p \log p$). The slack is exploited by the compiler to schedule and pipeline computation and communication efficiently. The high level languages that can be compiled allow a virtual shared address space. The program must be expressed so that v parallel instruction streams can be compiled from it. A PRAM language with slack is ideal, but many alternative styles may be appropriate also. For definitions of PRAM languages, see D. Eppstein and Z. Galil. Parallel algorithmic techniques for combinatorial computation, *Ann. Rev. Comput. Sci.* (1988) 3:233-83; and in R. M. Karp and V. Ramachandran, A survey of parallel algorithms for shared-memory machines, *Handbook of Theoretical Computer Science*, (ed. J. van Leeuwen) North Holland, Amsterdam (1990).

We note that in a general purpose setting some slack may be unavoidable if parallel programs are to be compiled efficiently. Certainly the prospects for compiling sequential code into parallel code, which is the extreme opposite case of $v = 1$, look bleak. The intermediate case of $p = v$ looks unpromising also if we are aiming for optimality. Hence, the discipline implied, that of using fewer processors than the degree of parallelism available in the program, appears to be an acceptable general approach to computation intensive problems. The importance of slack has been emphasized earlier in C. P. Kruskal, L. Rudolph and M. Snir. A complexity theory of efficient parallel algorithms Theoretical Computer Science 71 (1990) 95-132; and in L. G. Valiant, Optimally universal parallel computers, *Phil. Trans. R. Soc. Lond.*, A326 (1988) 373-376.

It is worth pointing out that, while these automatic memory and communication management techniques are available, the model does not make their use obligatory For the purpose of reducing the amount of slack required, improving constant factors in runtime, or avoiding hashing (as used by the automatic memory management scheme), the programmer may choose to keep control of these tasks. We shall give some illustrative examples of bulk-synchronous algorithms that are appropriate for this model.

It is striking that despite the breadth of relevant research in recent years, no substantial impediments to general purpose parallel computation as we interpret it here have been uncovered. This contrasts with noncomputability and NP-completeness results that explain the intractability of numerous other computational endeavors that had been pursued. Many of the results that have been obtained and to which we shall refer here in justification of the BSP model are efficient universality results in the style of Turing's theorem about universal machines. Hence, the BSP model can be viewed as a pragmatic embodiment of these positive results much as the von Neumann model is a pragmatic embodiment of Turing's theorem.

The BSP model of parallel computation or a bulk-synchronous parallel computer (BSPC) is the combination of four principal attributes..

a) A number of components PE, each performing computing and/or memory functions. Each component has facilities for interfacing with the router.

b) A router 12 that delivers messages point to point between pairs of components. The router can be implemented by an electronic or optical packet switching network. In networks in which paths may consist of long sequences of connections, the latency caused by this is masked by pipelining.

c) Facilities 14 for synchronizing all or a subset of the components at regular intervals of L time units where L is the periodicity parameter. A computation consists of a sequence of supersteps. In each superstep each component is allocated a task of some combination of local computation steps, message transmissions and message arrivals from other components. After each period of L time units a global check is made to determine whether the superstep has been completed by all the components. If it has, then the machine proceeds to the next superstep. Otherwise the next period of L units is allocated to the unfinished superstep. As described below, alternative synchronization methods can be substituted here.

d) A hashing function 22 is associated with the processing components for distributing data to the memory components.

The definition is chosen to embody the simplest capabilities that suffice for our purposes. In separating the components from the router we emphasize that the tasks of computation and communication can be separated The function of the router is to deliver messages point to point. It is intended particularly for implementing storage accesses between distinct components. It assumes no combining, duplicating or broadcasting facilities although these may be included. Similarly the synchronization mechanism we describe captures, in a simple way, the idea of global synchronization at a controllable level of coarseness. The availability of this synchronization mechanism on a machine gives an efficient way of implementing tightly synchronized parallel algorithms, among others, without over-burdening the programmer. We note that there exist alternative synchronization mechanisms that we can substitute to achieve the same purpose. For example, we may have the system check continuously whether the current superstep is completed, and allow it to proceed to the next superstep as soon as completion is detected. Provided we charge a minimum amount of L time units for this check, the results of the runtime analysis will not change by more then small constant factors. Such a mechanism is usually called barrier synchronization. It can be implemented in a variety of ways in communication networks, or more directly by a wire linking the parts to be synchronized (see Y. Birk, P. B. Gibbons, J. L. C. Sanz and D. Soroker, A simple mechanism for efficient barrier synchronization in MIMD machines, *Research Report RJ* 7078, (10/13/89). IBM Almaden Research Center, San Jose. Calif. (1989)).

The synchronization mechanism can be switched off for any subset of the components. We do not want processes that are independent of the results of processes at other components to be slowed down unnecessarily. When synchronization is switched off at a processor it can proceed without having to wait for completion of processes in the router or in other components. Also operations local to it will not automatically slow down computations elsewhere. On the other hand, even when this mechanism is switched off a processor can still send and receive messages and use such messages as an alternative method for synchronization. If performance guarantees are expected of this alternative synchronization mechanism then, assumptions have to be made about the router, such as that each message is delivered within a certain expected amount of time of being sent. In justifying the BSP model we use the barrier-style synchronization mechanism alone and make no assumptions about the relative delivery times of the messages within a superstep. In the simulations local operations are carried out only on a data locally available before the start of the current superstep.

The value of the periodicity L may be controlled by the program, even at runtime. The choice of its value is constrained in opposite directions by hardware and software considerations. Clearly the hardware sets lower bounds on how small L can be. The software, on the other hand, sets upper bounds on it since the larger L, the larger the granularity of parallelism that has to be exhibited by the program. This is because, to achieve optimal processor utilization, in each superstep each processor has to be assigned a task of about L steps that can proceed without needing results from other processors. We note that besides the tension between these two factors, there is also the phenomenon that a small L, while algorithmicly beneficial in general, may not yield any further advantages below a certain value. We also note that it is meaningful to allow different subsets of processors to have different values of L although the shared router will have just one such value.

In analyzing the performance of a BSP computer we assume that in one time unit an operation can be computed by a processing component on data available in memory local to it. The basic task of the router is to realize h-relations or in other words, supersteps in which each component sends and is sent at most h messages. A charge of $g'h+s$ time units is likely for realizing such an h-relation. Here $g'$ defines the basic throughput of the router when in continuous use and s is the latency or startup cost. Since we shall be interested only in optimal simulations, we will always assume that h is large enough that $g'h$ is at least of comparable magnitude to s. If $g'h \geq s$, for example, and we let $g = 2g'$, then we can simply charge gh time units for an h-relation and this will be an overestimate (by factor of at most two). Here we shall, therefore, define g to be such that h-relations can be realized in time gh for h larger than some $h_o$. This g can be regarded as the ratio of the time devoted by a processing element to each message transmission or arrival as compared with the time for a computational operation on local data. In other words, g is the ratio of the computational bandwidth of the system to the communication bandwidth of the router. Note that if $L \geq gh_o$ then every h-relation for $h < h_o$ will be charged as an $h_o$-relation.

Even in a fixed technology, we think of the parameter g as being controllable, within limits, in the router design. It can be kept low by using more pipelining or by having wider communication channels. Keeping g low or fixed as the machine size p increases incurs, of course, extra costs In particular, as the machine scales up, the hardware investment for communication needs to grow faster than that for computation. Our thesis is that, if these costs are paid, then machines of a new level of efficiency and programmability can be attained.

We note that the von Neumann model as generally understood leaves many design choices open. Implementations incorporating some additions, such as memory hierarchies, do not necessarily become inconsistent with the model. In a similar spirit we have left many options in the BSP computer open. We allow for both single and multiple instruction steams. While it will be convenient in this paper to assume that each component consists of a sequential von Neumann processor attached to a block of local memory, we do not exclude other arrangements. For example, a component may have parallelism within it. For efficiently executing programs with slack, each component will require facilities for efficient context switching among the virtual processors. Also, we can envisage implementations of the BSP model that incorporate features for communication computation or synchronization that are clearly additional to the ones in the definition but still do not violate its spirit. Important candidates for such features include broadcasting, combining capabilities and the parallel prefix operation.

A formalization of perhaps the simplest instance of the BSP model is described in L. G. Valiant, General purpose parallel architectures, *Handbook of Theoretical Computer Science*, (ed. J. van Leeuwen) North Holland, Amsterdam (1990). where it is called an XPRAM. A fuller account of the simulation results as well as of their proofs can be found there.

Automatic Memory Management on the BSPC

High level languages enable the programmer to refer to a memory location used in a program by a symbolic address rather than by the physical address at which it is stored. For sequential machines conventional compiler techniques are sufficient to generate efficient machine code from the high level description. In the parallel case, where many accesses are made simultaneously and the memory is distributed over many components new problems arise. In particular, there is the primary problem of allocating storage in such a way that the computation will not be slowed down by memory accesses being made unevenly and overloading individual units.

The most promising method known for evening out memory accesses automatically in arbitrary programs is hashing. The motivating idea is that if the memory words are distributed among the memory units randomly, independently of the program, then the accesses to the various units should be about equally frequent. Since, however, the mapping from the symbolic addresses to the physical addresses has to be efficiently computable the description of the mapping has to be small. This necessitates that, instead of a true random mapping, a pseudo-random mapping or hash function be used. Hash functions for this parallel context have been proposed and analyzed in K. Mehlhorn and U. Vishkin, Randomized and deterministic simulations of PRAMs by parallel machines with restricted granularity of parallel memories, *Acta Informatica* 21 (1984) 339-374. An elegant class suggested by them with some provably desirable properties is the class of polynomials of degree $O(\log p)$ in arithmetic modulo m, where p is the number of memory elements, and m is a prime number equal to or not much larger than the total number of words in the memory space. Then address x is assigned among the elements numbered $0, 1 \ldots, p-1$ to element $h(x)$ mod p where h is an instance of the polynomial hash function.

Our observations in this section is that for hashing to succeed in parallel algorithms running at optimal efficiency some parallel slack is necessary, and a moderate amount is sufficient if g can be regarded as a constant.

To see necessity we note that, if only p accesses are made in a superstep to p components at random, then with high probability one component will get about log $p/\log \log p$ accesses, and some will get none. Hence, the machine will have to devote $\Omega(\log p/\log(\log p))$ time units to this rather than just a constant, which would be necessary for optimal throughput. We are using logarithms to the base two here, as we do throughout this text.

The positive side is that, if slightly more, namely plog p, random accesses are made in a superstep, then with high probability each component will get no more than 3log p which is only three times the expected number. Hence, these accesses could be implemented by the router in the optimal bound of $O(\log p)$. More generally, if pf(p) accesses are made randomly for any function f(p) growing faster than log(p), then the worst case access will exceed the average rate by even smaller factors.

This phenomenon can be exploited as follows. Suppose that each of the p components of the BSP computer consists of a memory and a processor. We make it simulate a parallel program with $v \geq p\log p$ virtual processors by allocating $v/p > \log p$ of them to each physical processor. Then the v memory requests will be spread evenly, about v/p per processor, and hence the machine will be able to execute this superstep in optimal $O(v/p)$ time with high probability. This analysis assumes, of course, that the v requests are to distinct memory locations. The more general case of concurrent accesses will be considered in the next section.

The conclusion is that, if hashing is to be exploited efficiently, then the periodicity L may as well be at least logarithmic, and if it is logarithmic, then optimality can be achieved. Furthermore, for the latter, known hash functions suffice (see L. G. Valiant, General purpose parallel architectures, *Handbook of Theoretical Computer Science*, (ed. J. van Leeuwen), North Holland. Amsterdam (1990)). In making this claim, we are charging constant time for the overheads of evaluating the hash function even at run-time. In justifying this, we can take the view that evaluating the hash function can be done very locally and, hence, fast. (The $O(\log(\log p))$ parallel steps needed to evaluate the log p degree polynomials may then be regarded as constants.) Alternatively, we can use hash functions that have not been fully analyzed. The most promising candidates are the polynomials as described above, but having low constant degree. Some positive analytic results have been given for these by A. Siegel, On universal classes of fast high performance hash functions, *Proc. 30th IEEE symp. on Foundations of Computer Science* (1989). Except for the degree one case, the polynomial hash functions are not bijective, and a further hashing-type operation is required to allocate the individual word uniquely in the chosen memory element (see L. G. Valiant, General purpose parallel architectures, *Handbook of Theoretical Computer Science*, (ed. J. van Leeuwen), North Holland, Amsterdam (1990)). Lastly, we note that the frequency of evaluating the addresses most often used can be reduced in practice by storing these addresses in tables.

Concurrent Memory Accesses on the BSPC

In the previous section we considered memory allocation in the case that simultaneous accesses to the same memory location are not allowed. In practice it is often convenient to allow in parallel programs several processors to read from a location or to write to a location (if there is some convention for resolving inconsistencies) and to allow broadcasting of information from one to all other processors. A formal shared memory model that allows arbitrary patterns of simultaneous accesses is the concurrent read concurrent write (CRCW) PRAM (see R. M. Karp and V. Ramachandran, A survey of parallel algorithms for shared-memory machines, *Handbook of Theoretical Computer Science*, (ed. J. van Leeuwen), North Holland, Amsterdam (1990)).

One approach to implementing concurrent memory accesses is by using networks that can combine and replicate messages in addition to delivering them point to point (see A. Gottlieb, et al.. The NYU ultracomputer Designing an MIMD shared memory parallel computer, *IEEE Trans. On Computers* 32:2 (1983) 175-189; and A. G. Ranade How to emulate shared memory, *Proc. 28th IEEE Symp. on Foundations of Comp Sci.* (1987) 185-194). In the BSP model, it is necessary to perform and charge for all the replicating and combining as processing operations at the components. It turns out, however, that even the most general model, the CRCW PRAM. can be simulated optimally on the BSP model given sufficient slack if g is regarded as a constant. In particular, it is shown in L. G. Valiant, General purpose parallel architectures, *Handbook of Theoretical Computer Science*, (ed. J. van Leeuwen) North Holland, (1990) that, $v=p^{1+\epsilon}$ for any $\epsilon>0$, then a v processor CRCW PRAM can be simulated on a p-processor BSP machine with $L \geq \log p$ in time $O(v/p)$ (where the constant multiplier grows as $\epsilon$ diminishes). The simulation uses a method for sorting integers in parallel due to S. Rajasekaran and J. H. Reif Optimal and sublogarithmic time randomized parallel sorting algorithms, *SIAM J. on Computing*, 18:3 (1989) 594-607, and employed in a similar context to ours by Kruskal, L. Rudolph and M. Snir. A complexity theory of efficient parallel algorithms, Theoretical Computer Science, 71 (1990) 95-132. Sorting is one of the basic techniques known for simulating concurrent accesses (see A. Borodin and J. E. Hopcroft, Routing merging and sorting on parallel models of computation, *J. Comp. Syst. Sci.* 30 (1985) 130-145). Since general sorting has nonlinear complexity we need to limit the domain, in this case to integers, to have any chance of an optimal simulation. The above-mentioned general simulation introduces constants that are better avoided where possible. Fortunately in many frequently occurring situations, much simpler solutions exist that a compiler might exploit. For example, suppose that we are simulating v virtual processors on a p-processor BSP computer and know that at any instant at most h accesses are made to any one location. If $v=\Omega(hplog\ p)$, then concurrent accesses can be simulated optimally by simply replicating any data item that is to be sent to r locations r times at the source processor (and charging for their transmission as for r messages) Similarly if any combining happens it does so at the target processor.

To show that this works we suppose that among the destination addresses of the v accesses made simultaneously there are t distinct ones, and the numbers going to them are $l_1, \ldots, l_t$ respectively, all at most h. Suppose that these are scattered randomly and independently among p memory units. Then the probability that a fixed unit receives more than x accesses is the probability that the sum of t independent random variables $\eta_j$ ($1 \leq j \leq t$), each taking value $l_j$ with probability $p^{-1}$ and value 0 otherwise, has value more than x. But a corollary of a result of Hoeffding is that if $\xi_j$ are independent random variables $0 \leq \xi_j \leq 1$ with expectaion $c_j$ ($j=1, \ldots, t$) and $\mu$ is the mean of $\{c_j\}$ then for $a < \min(\mu, 1-\mu)$.

$$\text{Prob}\left(\sum_{i=1}^{t} \xi_i \geq (\mu + a)t\right) \leq e^{-a^2 t/3\mu}.$$

If we set $\xi_1 = \eta_i/h$ so that $\mu = \Sigma l_j/(pht) = v/(pht)$, and let $a = \mu$, then the probability of $2\mu t$ being exceeded is at most $e^{-at/3} = e^{-v/3ph} \leq p^{-\gamma}$ if $v \geq 3\gamma hplog_e p$. Hence the probability that among the p processors at least one receives more than twice the expected number of accesses is at most p times this quantity, or $p^{1-\gamma}$. Hence $\gamma>1$ suffices to ensure optimality to within constant factors.

We also observe that there are several other global operations such as broadcasting or the parallel prefix that one might wish to have that can be made faster using special purpose hardware than through general simulations. The simulation result does imply, however, that for programs with sufficient slack these extra features provide only constant factor improvements asymptotically.

BSP Algorithms Without Hashing

Although the potential for automating memory and communication management via hashing is a major advantage of the model, the programmer may wish to retain control of these functions in order to improve performance or reduce the amount of slack required in programming. It appears that for many computational problems simple and natural assignments of memory and communication suffice for optimal implementations on the BSP model. A systematic study of such bulk-synchronous algorithms remains to be done. We can give, however, some illustrative examples. We note that several models of computation have been suggested, mostly on shared memory models, that allow for the extra costs of communication explicitly in some way. Several algorithms developed for these work equally well on the BSPC. Among such related models are the phase PRAM of Gibbons (P. B. Gibbons, A more practical PRAM model, *Proc. 1989 ACM Symposium on Parallel Algorithms and Architectures* (1989) 158-168), which incorporates barrier synchronization in a similar way to ours, but uses a shared memory Others include the delay model of Papadimitriou and Yannakakis, and the LPRAM of Aggarwal, et al. The algorithms we describe below are all tightly-synchronized in the sense that the runtime of their constituent subtasks can be predicted before runtime. There is also a context for parallelism where many tasks are to be executed with varying time requirements that cannot be determined in advance. In the most extreme case one has a number of subtasks whose runtime cannot be predicted at all. In this general dynamic load-balancing situation, there also exist phenomena that are compatible with barrier synchronization. In particular. Karp has given a load balancing algorithm that is optimal for any L for the model of Gibbons.

The advantages of implementaing algorithms directly on the BSP model rather than compiling them automatically, increase as the bandwidth parameter g increases. Hence it is appropriate to consider g explicitly in analysing the performance of these algorithms. An algorithm in this model will be broken into supersteps where the words read in each superstep are all last modified in a previous superstep. In a superstep of periodicity L. L local operations and a $\lfloor L/g \rfloor$ -relation message pattern can be realized. The parameters of the machine are therefore L, g and p the number of processors. Each algorithm also has a parameter n, the size of the problem instance. The complexity of an algorithm can be expressed in several ways in terms of these parameters. We will describe parallel algorithms in which the time-processor product exceeds the number of computational operations by only a fixed multiplicative constant, independent of L, g, p and n, provided that L and g are below certain critical values. In such "optimal" algorithms there may still be several directions of possible improvements, namely in the multiplicative constant as well as in the critical values of g and L.

As a simple example of a tightly synchronized algorithm well suited for direct implementation, consider multiplying two n×n matrices, A and B. using the standard algorithm on $p \leq n^2$ processors. Suppose we assign to each processor the subproblem of computing an n/$\sqrt{p}$ x n/$\sqrt{p}$ submatrix of the product. Then each processor has to receive data describing n/$\sqrt{p}$ rows of A and n/$\sqrt{p}$ columns of B Hence each processor has to perform $2n^3/p$ additions and multiplications and receive $2n^2/\sqrt{p} \leq 2n^3/p$ messages. Clearly if in addition each processor makes $2n^2/\sqrt{p}$ message transmissions then the runtime is affected by only a constant factor. Fortunately no more than this number of transmissions is required even if the elements are simply replicated at source. For if the matrices A and B are initially distributed uniformly among the p processors, $2n^2/p$ elements in each, and each processor replicates each of its elements $\sqrt{p}$ times and sends to the $\sqrt{p}$ processors that need these entries, then the number of transmissions per processor will indeed be this $2n^2/\sqrt{p}$. This is an instant of the point already made in the previous section, that concurrent accesses when the access multiplicity h is suitable small may be implemented efficiently by simple replicating data at the source. It is easily seen that optimal runtime $O(n^3/p)$ is achieved provided $g = O(n/\sqrt{p})$ and $L = O(n^3/p)$. (An alternative algorithm given in A. Aggarwal, A. Chandra and M Snir, Communication complexity of PRAMs, *Theoretical Computer Science*, 71 (1990) 3-28, that requires fewer messages altogether can be implemented to give optimal runtime with g as large as $O(n/p^{1/3})$ but L slightly smaller at $O(n^3/p \log n)$).

A case in which it would be inefficient to realize multiple accesses by replication at the source is broadcasting. Here one processor needs to send copies of a message to each of n memory locations spread uniformly among p components. Sending one copy to each of the p components can be accomplished in $\log_d p$ supersteps by executing a logical d-ary tree. In each superstep, each processor involved in this transmits d copies, to distinct components. Time dg $\log_d p$ is required for this. If n/p−1 further copies are made at each component then optimality (i.e. runtime O(n/p)) can be achieved if d = O((n/gplog p)log (n/(gplog p))) and L = O(gd). The constraint on d clearly implies that n = Ω(gplog p). Examples of these constraints are g = 1, in which case n = plog p and L = O(1) are sufficient, and g = log p, in which cse $n = p(\log p)^2$ and L = O(log p) suffice.

An operation more powerful than broadcasting is parallel prefix (see R. M. Karp and V. Ramachandran. A survey of parallel algorithms for shared-memory machines, *Handbook of Theoreticl Computer Science*, (ed. J. van Leeuwen), North Holland, Amsterdam (1990); and R. E. Ladner and M. J. Fischer, Parallel prefix computation, *JACM* 27 (1980) 831-838). Given $x_1 \ldots x_n$, one needs to compute $x_1 o x_2 o \ldots o x_i$ for $1 \leq i \leq n$, for some associative operation o. The now standard recursive algorithm for this, but with d-ary rather than binary recursion, yields exactly the same constraints as those obtained above for broadcasting.

There are several important algorithms such as the Fast Fourier Transform that can be implemented directly on the butterfly graph As observed in C. H. Papadimitriou and M. Yannakakis, Towards an architecture-independent analysis of parallel algorithms *Proc. 20th ACM Symp. on Theory of Computing* (1988) 510-513, an instance of such a graph with n inputs can be divided into (log n)/log d successive layers, where each layer consists of (n log d)/d independent butterfly graphs of d/log d inputs each. This is true for any $d \geq 2$ if the expressions are rounded to integers appropriately. We can, therefore, evaluate such a graph on p = (n log d)/d processors in (log n)/log d supersteps, in each of which each processor computes d local operations and sends and receives d/log d messages. Hence, optimality can be achieved if $g = O(\log d) = O(\log(n/p))$, and $L \leq d = O((n/p)\log(n/p))$.

Yet a further problem for which bulk-synchronous algorithms are of interest is sorting. Among known algorithms that are well suited is Leighton's columnsort For sorting n items on $p = O(n^{1/3})$ processors it executes eight consecutive stages. In the odd-numbered ones, each processor sorts a set of n/p elements sequentially. In the even-numbered stages, the data is permuted among the processors in a certain regular pattern. Hence computation and communication are separated at the coarsest scale. For optimal runtime on the BSP model, the communication time O(gn/p) must not exceed the computation time of (n/p)log(n/p) which is required by each stage of sequential comprison sorting. Hence g = O(log(n/p)) and L = O((n/p)log(n/p)) suffice.

More generally, it is clear that any BSP machine would impose an upper bound on p, the number of processors, as well as a lower bound on the value of g that can be achieved. Also, for any g to be achieved, a lower bound on L may be implied. One can, therefore, imagine transportable BSP software to be written in such a way that the code that will be compiled depends not only on the problem size n but also on the parameters p, g and L.

Implementation on Packet Switching Networks

The communication medium or router of the BSP model is defined to be the simplest possible with the hope that it can be implemented efficiently in various competing technologies. In current parallel machines, the favored method of communication is via networks that do some kind of packet switching. Our main argument will refer, therefore, to this. In implementing the BSP model on a packet switching network, the main tool available is that of pipelining communication. The conclusion will be that a network such as a hypercube will suffice for optimality to within constant factors, but only if its communication bandwidth is balanced with its computational capability. To simulate the BSP model with bandwidth factor g, we will need essentially that the computational bandwidth of a node does not exceed the communication bandwidth of the connection between a pair of adjacent nodes by more than a factor of g.

Packet routing on regular networks has received considerable attention. Consider a hypercube network and suppose that in g units of time a packet can traverse one edge of it. Thus, a single packet will typically take glog p time to go to an arbitrary destination. A paradigmatic case of parallel packet routing is that of routing permutations Here each of the p processors wishes to send a message to a distinct destination. What is required is a distributed routing algorithm that needs no global knowledge of the message pattern and ensures that all the packets arrive fast, even when fully allowing for contention at the edges. It turns out that a simple two-phase randomized routing algorithm (see L. G. Valiant. A scheme for fast parallel communication. *SIAM J. on Computing*, 11(1982) 350-361; and L. G. Valiant, General purpose parallel architectures. *Handbook of Theoretical Computer Science*, (ed. J. van Leeuwen), North Holland. Amsterdam (1990)) suffices to give runtime of about 2 g log p with overwhelming probability.

While this is optimal for permutation routing, it does not imply optimal BSP simulations immediately since it corresponds to the case of 1-relations and would require a factor of at least log p more in communication compared with computation time.

In order to obtain an optimal BSP simulation, we need to use the fact that two-phase randomized routing can support heavier message densities. It turns out that, if there are log p packets initially at each node with at most log p destined to any one target, then O(g log p) time still suffices for all the p log p packets to reach their destinations (see E. Upfal, Efficient schemes for parallel communication, *JACM* 31:3 (1984) 507-517; and L. G. Valiant. General purpose parallel architectures, *Handbook of Theoretical Computer Science*, (ed. J. van Leeuwen), North Holland, Amsterdam (1990)) In other words, log p relations can be realized essentially as fast as 1-relations. This gives an optimal simulation of a BSP machine with L>glog p since then in each superstep we need to simulate L local operations at each processor and realize an L/g-relation in the router. All this can be simulated in time O(L) on the hypercube. We note that the simulations give small constant factors, and experiments show that small queues suffice.

What this routing algorithm achieves is that it masks the log p latency of the network by pipelining. It gives the hypercube a bandwidth of $\Omega(p)$ packet arrivals every time unit, rather than the O(p/log p) which is achieved for 1-relations. More generally, pipelining in a network may become efficacious already when there are paths of even two edges and would be recommended when they get longer, such as five edges. The idea of hiding latency by pipelining in a setting much less specific than ours has been previously proposed by B. Smith.

Further details of results on routing can be found in L. G. Valiant, General purpose parallel architectures, *Handbook of Theoretical Computer Science*, (ed. J. van Leeuwen), North Holland, Amsterdam (1990). All the indications are that this problem has a variety of practical and efficient solutions. For example, instead of store-and-forward message passing, one could consider bit-streamed or wormhole routing which exhibits similar phenomena (see B Aiello, F. T. Leighton. B. Maggs and M. Neumann, Fast algorithms for bit-serial routing on a hypercube, Manuscript, (1990)). We also note that, if the address space is already randomized by hashing, then, for implementing memory accesses, two-phase routing may replaced by one-phase deterministic routing (see A. G. Ranade, How to emulate shared memory, *Proc. 28th IEEE Symp. on Foundations of Comp. Sci.* (1987) 185-19401). We note, however, that Ranade's particular scheme loses a logarithmic factor in the simulation. In addition, it loses a substantial multiplicative constant factor as compared with a basic point to-point router because of the additional functionality in the network. Although we do not preclude the router from having such extra functionality, it is preferable that, in the current invention this does not degrade the performance for basic point-to-point routing by more than a small constant factor such as two or three as compared to what is possible in the same technology.

Since the BSP model separates computation from communication, no particular network topology is favored beyond the requirement that a high throughput be delivered. An example related to the hypercube that suffices under similar conditions is the butterfly which would consist of (log p)+1 levels of p nodes each. One of the levels would be allocated to processor/memory components and the rest to switches.

Implementation on Optical Crossbars

Since we envisage the BSP computer as being realizable in a variety of technologies, we conclude here by observing that it can be implemented optimally on a simple model of computation suggested by the possibilities of optical technology.

In this model, in each time step each of p components can transmit a message by directing a beam of light at a chosen other component. If a component receives just one message, it acknowledges it and transmission is considered successful. On the other hand. if more than one beam is directed at a node, then none of the messages is successfully received at that node, and the absence of a valid acknowledgement informs a sender of the failure. Such a model has been considered in R. J. Anderson and G. L. Miller, Optical communication for pointer based algorithms, *Tech. Rep. CRI* 88-14, Comp. Sci Dept., Univ of Southern California (1988); and in E. S. Masniloff, K. M. Johnson and J. H. Reif. Holographic routing network for parallel processing machines, Society of Photo Optical Instrumentation Engineers (SPIE), Paris, France (1989), Vol. 1136, *Holographic Optics II, Principles and Applications,* 283-289.

In light of our earlier discussion on simulating shared memory by hashing using periodicity L≧log p, a crucial case for this optical model is that of a superstep in which each processor sends up to log p messages, each receives up to about the same number, and there is no other detectable pattern to the requested global communication. It is observed in L. G. Valiant, General purpose parallel architectures, *Handbook of Theoretical Computer Science,* (ed. J. van Leeuwen), North Holland, Amsterdam (1990) that a randomized algorithm of Anderson and Miller suffices to perform this communication on this optical model in O(log p) time steps which is optimal. Hence, if such a time step corresponds to g time units, then this model can simulate a $\Omega$(plog p) BSP computer optimally. We note that, in this case, we have a low latency network, and the gains are obtained by techniques other than pipelining.

Conclusion

We have defined the BSP model and argued that it is a promising candidate as bridging model for general purpose parallel computation. As supporting evidence, we have described how a variety of efficiency phenomena, mostly discovered in various other contexts, can be exploited by this one model. No single factor is, or can be, decisive in confirming the adequacy of a bridging model. It is the diversity of the considerations that are in support of the model and the apparent absence of contrary indications that is here most compelling.

The considerations we have analysed are all concerned with providing guaranteed performance at near optimal processor utilization. Since the primary object of parallel computing is to obtain high throughput, we consider such quantitative criteria to be critical In the spectrum of imaginable computations, we have addressed the end that is most communication intensive, since this case cannot be evaded in a general purpose setting. We have been careful, however, to ensure that less constrained computations, where independent processes can proceed with infrequent communication, are not penalized.

The arguments given in support of the BSP model are of three kinds. First, we argue that, if the computational and communication bandwidths are suitably balanced (i.e., g is a small constant such as one). then the model has a major advantage as far as programmability at least for programs with sufficient slack. In that case, the memory and communication management needed to implement a virtual shared memory can be done with only a constant factor loss in processor utilization. The constants needed in the simulations are known to be small, except in the case that concurrent accesses are made with high levels of concurrency to each of many single locations simultaneously. Currently existing machines have higher values of g than is required here. Our arguments can be interpreted as saying that, if the relative investment in communication hardware were suitably increased, then machines with a new level of programmability would be obtained. We note that, for certain programs in which automatic memory allocation is useful, the effective value of g can be made smaller than the physical value by exploiting locality and viewing the computation at a higher level of granularity. For example in finite element methods, the virtual memory can be regarded as partitioned into segments each of which is to be stored in a single memory component. In this case, it would be appropriate for only a part of each memory module to be hashed, and the rest addressed locally from the hashed part. The number of computation steps per segment may then greatly exceed the number of nonlocal memory accesses.

The second kind of argument given is that several important algorithms can be implemented directly on this model. Such an implementation avoids the overheads of automatic memory management and may exploit the relative advantage in throughput of computation over communication that may exist.

The third argument is that the BSP model can be implemented efficiently in a number of technologies. We illustrate this by giving an efficient simulation on both a hypercube network as well as on a model suggested by optical communication. We observe, however, that the BSP model is not particularly associated with any one technology or topology The only requirement on the router is a certain level of communication throughput, however, achieved. Clearly, the promise of optical technologies looks attractive in the BSP context.

While this invention has been particularly shown and described with references to preferred embodiments thereof, it will be understood by those skilled in the art that various changes in form and details may be made therein without departing from the spirit and scope of the invention as defined by the appended claims. For example, software and hardware implementations are often interchangeable. Also, the various functions to be performed can be shared or overlapped among the various software and hardware modules in numerous combinations. The block diagrams are intended to illustrate the various system functions without limiting the actual hardware and software implementation.

I claim:

1. A multiple instruction, multiple data, parallel processor system comprising:
 a plurality of computational and memory elements;
 a hashing module for providing each of the computational elements with a common hashing function associated therewith for assigning data to the memory elements creating an apparently randomized memory space;
 a parallel router for routing data transfers between computational and memory elements in parallel, the parallel router routing the data transfers independently of continued computation and storage access in the computational and memory elements and masking any substantial latency therein; and
 a synchronizer for synchronizing multiple instruction computational tasks in individual computational elements in supersteps of a plurality of computational steps such that individual computational and routing tasks are completed in all synchronized computational elements before the elements proceed to subsequent tasks, wherein each computational element may proceed through the superstep without needing results from other computational elements.

2. A systems as claimed in claim 1 wherein the computational bandwidth of the elements is substantially matched to the communication bandwidth of the router in that a ratio g of the first to the second is less than or equal to 10.

3. A system as claimed in claim 2 wherein a program being processed is compiled to a plurality of virtual processor routines processed by the computational elements, the plurality of virtual processor routines of at least about plog p where p is the number of computational elements in the system.

4. A system as claimed in claim 2 wherein the synchronizer synchronizes computations in computational elements in supersteps of L computational steps where L is at least about glog p.

5. A system as claimed in claim 1 wherein a program being processed is compiled to a plurality of virtual processor routines processed by the computational elements, the plurality of virtual processor routines of at least about plog p where p is the number of computational elements in the system.

6. A system as claimed in claim 5 wherein the synchronizer synchronizes computations in computational elements in supersteps of L computational steps where L is at least about glog p.

7. A system as claimed in claim 1 wherein the synchronizer synchronizes computations in computational elements in supersteps of L computational steps where L is at least about glog p, where p is the number of computational elements in the system, and g is the ratio of the computational bandwidth of the computational elements to the communication bandwidth of the router.

8. A system as claimed in claim 1 wherein each computational element comprises a hashing module.

9. A system as claimed in claim 8 wherein each hashing module is a hardware module.

10. A system as claimed in claim 1 wherein latency in the router is masked by a pipelined router.

11. A system as claimed in claim 1 wherein the router is of low latency.

12. A multiple instruction, multiple data, parallel processor system comprising:
 a plurality of computational and memory elements;
 a hashing module associated with each computational element for providing each of the computational elements with a common hashing function associated therewith for assigning data to the memory elements creating an apparently randomized memory space;
 a program compiled to a plurality of virtual processor routines processed by the computational elements, the plurality of virtual processor routines of at least about plog p where p is the number of computational elements in the system;
 a parallel router for routing data transfers between computational and memory elements in parallel, the parallel router routing the data transfers independently of continued computation and storage access in the computational and memory elements and masking any substantial latency therein; and
 a synchronizer for synchronizing multiple instruction computational tasks in individual computational elements in supersteps of L computational steps where L is at least about glog p, where p is the number of computational elements in the system, and g is the ratio of the computational bandwidth of the computational elements to the communication bandwidth of the router, such that individual computational and routing tasks are completed in all synchronized computational elements before the elements proceed to subsequent tasks, wherein L is chosen so that each computational element may proceed through the superstep without needing results from other computational elements.

13. A method of processing a program in parallel processors comprising:
 providing a plurality of computational elements, having a hashing module, and memory elements;
 applying a hashing function to assign data to memory elements to apparently randomize the memory space in which data is stored;
 routing data transfers between computational and memory elements independently of continued computation and storage access in the computational and memory elements, any substantial routing latency being masked; and
 synchronizing multiple instruction computational tasks in supersteps of a plurality of computational steps in individual computational elements by completing all computational and routing tasks in synchronized computational elements before processing subsequent tasks in the computational elements, wherein each computational element may proceed through the superstep without needing results from other computational elements.

14. A method as claimed in claim 13 wherein the computational bandwidth of the elements is substantially matched to the communication bandwidth of the router in that a ratio g of the first to the second is less than or equal to 10.

15. A method as claimed in claim 14 further comprising compiling a program to a plurality of virtual processor routines processed by the computational elements, the plurality of virtual processor routines of at least about plog p where p is the number of computational elements in the system.

16. A method as claimed in claim 15 wherein the computational tasks are synchronized in supersteps of L computational steps where L is at least about glog p.

17. A method as claimed in claim 14 wherein the computational tasks are synchronized in supersteps of L computational steps where L is at least about glog p.

18. A method as claimed in claim 13 further comprising compiling a program to a plurality of virtual processor routines processed by the computational elements, the plurality of virtual processor routines of at least about plog p where p is the number of computational elements in the system.

19. A method as claimed in claim 18 wherein the computational tasks are synchronized in supersteps of L computational steps where L is at least about glog p.

20. A method as claimed in claim 13 wherein the computational tasks are synchronized in supersteps of L computational steps where L is at least about glog p.

21. A method as claimed in claim 13 wherein the hashing function is applied in a hashing module in each computational element.

22. A method as claimed in claim 21 wherein each hashing module is a hardware module.

23. A method as claimed in claim 13 wherein routing latency is masked by pipelining.

24. A method as claimed in claim 13 wherein there is no substantial latency.

25. A multiple instruction, multiple data, parallel processor system comprising:
 a plurality of computational and memory elements;
 a hashing module for providing each of the computational elements with a common hashing function associated therewith for assigning data to the memory elements creating an apparently randomized memory space;
 a program compiled to a plurality of virtual processor routines processed by the computational elements, the plurality of virtual processor routines of at least about plog p where p is the number of computational elements in the system;
 a parallel router for routing data transfers between computational and memory elements in parallel, the parallel router routing the data transfers independently of continued computation and storage access in the computational and memory elements and masking any substantial latency therein; and a synchronizer for synchronizing multiple instruction computational tasks in individual computational elements in supersteps of L computational steps where L is at least about $g \log p$, where g is the ratio of the computational bandwidth of the computational elements to the communication bandwidth of the router, such that individual computational and routing tasks are completed in all synchronized computational elements before the elements proceed to subsequent tasks, wherein L is chosen so that each computational element may proceed through the superstep without needing results from other computational elements, wherein the computational bandwidth of the elements of the system is substantially matched to the communication bandwidth of the router in that a ratio of the first to the second is less than or equal to 10.

* * * * *